United States Patent
Bronchain et al.

(10) Patent No.: US 12,166,879 B2
(45) Date of Patent: Dec. 10, 2024

(54) REJECTION OF MASKED POLYNOMIALS

(71) Applicant: NXP B.V., Eindhoven (NL)

(72) Inventors: Olivier Bronchain, Auderghem (BE); Tobias Schneider, Graz (AT)

(73) Assignee: NXP B.V., Eindhoven (NL)

(*) Notice: Subject to any disclaimer, the term of this patent is extended or adjusted under 35 U.S.C. 154(b) by 255 days.

(21) Appl. No.: 17/811,669

(22) Filed: Jul. 11, 2022

(65) Prior Publication Data

US 2024/0015012 A1    Jan. 11, 2024

(51) Int. Cl.
*H04L 9/30*    (2006.01)

(52) U.S. Cl.
CPC ...... *H04L 9/3093* (2013.01); *H04L 2209/046* (2013.01)

(58) Field of Classification Search
CPC .......... H04L 9/3093; H04L 2209/046
See application file for complete search history.

(56) References Cited

U.S. PATENT DOCUMENTS

| 10,855,443 B2 | 12/2020 | Trichina et al. |
| 2020/0265167 A1 | 8/2020 | Banerjee et al. |

FOREIGN PATENT DOCUMENTS

FR    2926652 A1    1/2008

OTHER PUBLICATIONS

Barthe, et al., "Masking the GLP Lattice-Based Signature Scheme at Any Order", 2018, Advances in Cryptology—EUROCRYPT 2018 37th Annual International Conference on the Theory and Applications of Cryptographic Techniques (Year: 2018).*
Coron, et al., "High-Order Polynomial Comparison and Masking Lattice-based Encryption", 2021, Cryptology ePrint Archive, Report 2021/1615 (Year: 2021).*
Migliore, et al., "Masking Dilithium: Efficient Implementation and Side-Channel Evaluation", 2019, Applied Cryptography and Network Security—17th International Conference, ACNS 2019 (Year: 2019).*

(Continued)

*Primary Examiner* — Daniel B Potratz (57) ABSTRACT

Various embodiments relate to a data processing system including instructions embodied in a non-transitory computer readable medium, the instructions for a cryptographic operation using masked coefficients of a polynomial having d arithmetic shares for lattice-based cryptography in a processor, the instructions including: shifting an arithmetic share of the d arithmetic shares by a first bound $\lambda_0$; converting the d shifted arithmetic shares to d Boolean shares; securely subtracting the first bound $\lambda_0$ and a second bound $\lambda_1$ from the Boolean shares to obtain $z'^{B,k+1}$ having d shares, wherein k is the number of bits in the masked coefficients of the polynomial; setting the shares of a boundary check bit to a sign bit of $z'^{B,k+1}$; and carrying out a cryptographic operation using the d arithmetic shares of the polynomial when the d shares of the boundary check bit indicate that the coefficients of the polynomial are within the first bound $\lambda_0$ and second bound $\lambda_1$.

22 Claims, 2 Drawing Sheets

(56) References Cited

OTHER PUBLICATIONS

U.S. Appl. No. 17/935,550; Inventor: Melissa Azouaoui, et al.; "Protecting Polynomial Rejection Through Masked Compressed Comparison;" filed Sep. 26, 2022.

Gilles Barthe, Sonia Belai:d, Thomas Espitau, Pierre-Alain Fouque, Benjamin Gre-goire, Melissa Rossi, and Mehdi Tibouchi, Masking the GLP lattice-based signature scheme at any order, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384.

Olivier Bronchain and Gaetan Cassiers, Bitslicing arithmetic/boolean masking con versions for fun and profit with application to lattice-based kems, IACR Cryptol. ePrint Arch. (2022), 158.

Jean-Sebastien Coron, Francois Gerard, Simon Montoya, and Rina Zeitoun, High order polynomial comparison and masking lattice-based encryption, Cryptology ePrint Archive, Report 2021/1615, 2021, https: / /ia. er/2021/1615.

L. Ducas, Eike Kiltz, Tancrede Lepoint, Vadim Lyubashevsky, P. Schwabe, Gregor Seiler, and D. Stehle, Crystals-dilithium algorithm specifications and supporting documentation (version 3.1), 2021.

Francois Gerard and Melissa Rossi, An efficient and provable masked implementation of qtesla, Smart Card Research and Advanced Applications—18th International Conference, CARDIS 2019, Prague, Czech Republic, Nov. 11-13, 2019, Revised Selected Papers (Sonia Belaid and Tim Giineysu, eds.), Lecture Notes in Computer Science, vol. 11833, Springer, 2019, pp. 74-91.

Vadim Lyubashevsky, Chris Peikert, and Oded Regev, On ideal lattices and learning with errors over rings, EUROCRYPT 2010 (Henri Gilbert, ed.), Springer Berlin Heidelberg, 2010, pp. 1-23.

Vincent Migliore, Benott Gerard, Mehdi Tibouchi, and Pierre-Alain Fouque, Masking dilithium—efficient implementation and side-channel evaluation, Applied Cryptography and Network Security—17th International Conference, ACNS 2019. Bogota, Colombia, Jun. 5-7, 2019, Proceedings (Robert H. Deng, Valerie Gauthier-Umana, Martin Ochoa, and Moti Yung, eds.), Lecture Notes in Computer Science, vol. 11464, Springer, 2019, pp. 344-362.

National Institute of Standards and Technology, Post-quantum cryptography standardization, https: / / csrc.nist .gov/Pro j acts/Post-Quantum-Cryptography/ Post-Quantum-Cryptography-Standardization, 2021.

Oded Regev, On lattices, learning with errors, random linear codes, and cryptography, ACM Symposium on Theory of Computing 2005 (Harold N. Gabow and Ronald Fagin, eds.), ACM, 2005, pp. 84-93.

Matthieu Rivain and Emmanuel Prouff, Provably secure higher order masking of AES, Cryptographic Hardware and Embedded Systems, CHES 2010, 12th International Workshop, Santa Barbara, CA, USA, Aug. 17-20, 2010. Proceedings (Stefan Mangard and Francois-Xavier Standaert, eds.), Lecture Notes in Computer Science, vol. 6225, Springer, 2010, pp. 413-427.

* cited by examiner

REJECTION OF MASKED POLYNOMIALS

TECHNICAL FIELD

Various exemplary embodiments disclosed herein relate generally to the rejection of masked polynomials including improved masked norm-based rejection of masked polynomials.

BACKGROUND

Recent significant advances in quantum computing have accelerated the research into post-quantum cryptography schemes: cryptographic algorithms which run on classical computers but are believed to be still secure even when faced with an adversary with access to a quantum computer. This demand is driven by interest from standardization bodies, such as the call for proposals for new public-key cryptography standards by the National Institute of Standards and Technology (NIST). The selection procedure for this new cryptographic standard has started and has further accelerated the research of post-quantum cryptography schemes.

There are various families of problems to instantiate these post-quantum cryptographic approaches. Constructions based on the hardness of lattice problems are considered to be promising candidates to become the next standard. A subset of approaches considered within this family are instantiations of the Learning With Errors (LWE) framework: the Ring-Learning With Errors problem. One of the leading lattice-based signature schemes is Dilithium which requires operations involving arithmetic with polynomials with integer coefficients. More precisely, computations are done in a ring $R_q=(\mathbb{Z}/q\mathbb{Z})[X]/(F)$: the ring where polynomial coefficients are in $\mathbb{Z}/q\mathbb{Z}$ and the polynomial arithmetic is performed modulo a polynomial F.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a data processing system including instructions embodied in a non-transitory computer readable medium, the instructions for a cryptographic operation using masked coefficients of a polynomial having d arithmetic shares for lattice-based cryptography in a processor, the instructions, including: shifting an arithmetic share of the d arithmetic shares by a first bound $\lambda_0$; converting the d shifted arithmetic shares to d Boolean shares; securely subtracting the first bound $\lambda_0$ and a second bound $\lambda_1$ from the Boolean shares to obtain $z'^{B,k+1}$ having d shares, wherein k is a number of bits in the masked coefficients of the polynomial; setting the shares of a boundary check bit to a sign bit of $z'^{B,k+1}$; and carrying out a cryptographic operation using the d arithmetic shares of the polynomial when the d shares of the boundary check bit indicate that the coefficients of the polynomial are within the first bound $\lambda_0$ and second bound $\lambda_1$.

Various embodiments are described, further including unmasking the boundary check bit by combining the d shares of the boundary check bit.

Various embodiments are described, wherein shifting an arithmetic share of the d arithmetic shares by a first bound $\lambda_0$ includes calculating: $x'^{A_q}_0 \leftarrow x^{A_q}_0 + \lambda_0 \mod q$, where $x^{A_q}_0$ is an arithmetic masked coefficient of a polynomial and q is an integer modulus.

Various embodiments are described, wherein converting the d shifted arithmetic shares to d Boolean shares includes calculating $x'^{B,k} \leftarrow A2B_q(x'^{A_q}_0)$, where $x'^{B,k}$ is the shifted Boolean shares, $x'^{A_q}_0$ are the d shifted arithmetic shares, $A2B_q$ is a function that converts arithmetic shares to Boolean shares, and q is an integer modulus.

Various embodiments are described, wherein securely subtracting the first bound $\lambda_0$ and a second bound $\lambda_1$ from the Boolean shares includes converting $\lambda_0+\lambda_1$ to a two's complement representation and securely adding the two's complement representation to the Boolean shares.

Various embodiments are described, wherein converting $\lambda_0+\lambda_1$ to a two's complement representation and securely adding the two's complement representation to the Boolean shares includes calculating $z'^{B,k+1} \leftarrow SecAdd(x'^{B,k}, 2^{k+1}-(\lambda_0++1))$ where $x'^{B,k}$ is the shifted Boolean shares and k is a number of bits of $x'^{B,k}$.

Further various embodiments relate to a data processing system including instructions embodied in a non-transitory computer readable medium, the instructions for a cryptographic operation using masked coefficients of a polynomial having d arithmetic shares for lattice-based cryptography in a processor, the instructions, including: performing a boundary check on each of the coefficients of the polynomial, wherein the performing the boundary check includes: shifting an arithmetic share of the d arithmetic shares by a first bound $\lambda_0$; converting the d shifted arithmetic shares to d Boolean shares; securely subtracting the first bound $\lambda_0$ and a second bound $\lambda_1$ from the Boolean shares to obtain $z'^{B,k+1}$ having d shares, wherein k is a number of bits in the masked coefficients of the polynomial; setting the shares of a boundary check bit to a sign bit of $z'^{B,k+1}$; and combining the shares of the boundary check bits for all of the coefficients of the polynomial to produce a boundary check bit b; and carrying out a cryptographic operation using the d arithmetic shares of the polynomial when b indicates that the coefficients of the polynomial are within the first bound $\lambda_0$ and second bound $\lambda_1$.

Various embodiments are described, wherein shifting an arithmetic share of the d arithmetic shares by a first bound $\lambda_0$ includes calculating: $x'^{A_q}_0 \leftarrow x^{A_q}_0 + \lambda_0 \mod q$, where $x'^{A_q}_0$ is an arithmetic masked coefficient of a polynomial, $x'^{A_q}_0$ is the shifted arithmetic shares, and q is an integer modulus.

Various embodiments are described, wherein converting the d shifted arithmetic shares to d Boolean shares includes calculating $x'^{B,k}$, where $x'^{B,k}$ is the shifted Boolean shares, $x'^{A_q}_0$ are the d shifted arithmetic shares, $A2B_q$ is a function that converts arithmetic shares to Boolean shares, and q is an integer modulus.

Various embodiments are described, wherein securely subtracting the first bound $\lambda_0$ and a second bound $\lambda_1$ from the Boolean shares includes converting $\lambda_0+\lambda_1$ to a two's complement representation and securely adding the two's complement representation to the Boolean shares.

Various embodiments are described, wherein includes calculating $z'^{B,k+1} \leftarrow SecAdd(x'^{B,k}, 2^{k+1}-(\lambda_0+\lambda_1+1))$ where $x'^{B,k}$ is the shifted Boolean shares and k is a number of bits of $x'^{B,k}$.

Further various embodiments relate to a method for a cryptographic operation using masked coefficients of a polynomial having d arithmetic shares for lattice-based cryptography in a processor, the instructions, including: shifting an arithmetic share of the d arithmetic shares by a first bound $\lambda_0$; converting the d shifted arithmetic shares to d Boolean shares; securely subtracting the first bound $\lambda_0$ and a second bound $\lambda_1$ from the Boolean shares to obtain $z'^{B,k+1}$ having d shares, wherein k is a number of bits in the masked coefficients of the polynomial; setting the shares of a boundary check bit to a sign bit of $z'^{B,k+1}$; and carrying out a cryptographic operation using the d arithmetic shares of the polynomial when the d shares of the boundary check bit indicate that the coefficients of the polynomial are within the first bound $\lambda_0$ and second bound $\lambda_1$.

Various embodiments are described, further including unmasking the boundary check bit by combining the d shares of the boundary check bit.

Various embodiments are described, wherein shifting an arithmetic share of the d arithmetic shares by a first bound $\lambda_0$ includes calculating: $x'^{A_q}_0 \leftarrow x_0^{A_q} + \lambda_0 \bmod q$, where $x_0^{A_q}$ is an arithmetic masked coefficient of a polynomial and q is an integer modulus.

Various embodiments are described, wherein converting the d shifted arithmetic shares to d Boolean shares includes calculating $x'^{B,k} \leftarrow A2B_q(x'^{A_q})$, where $x'^{B,k}$ is the shifted Boolean shares, $x'^{A_q}$ are the d shifted arithmetic shares, $A2B_q$ is a function that converts arithmetic shares to Boolean shares, and q is an integer modulus.

Various embodiments are described, wherein securely subtracting the first bound $\lambda_0$ and a second bound $\lambda_1$ from the Boolean shares includes converting $\lambda_0+\lambda_1$ to a two's complement representation and securely adding the two's complement representation to the Boolean shares.

Various embodiments are described, wherein converting $\lambda_0+\lambda_1$ to a two's complement representation and securely adding the two's complement representation to the Boolean shares includes calculating $z'^{B,k+1} \leftarrow \mathrm{SecAdd}(x'^{B,k}, 2^{k+1}-(\lambda_0+\lambda_1+1))$ where $x'^{B,k}$ is the shifted Boolean shares and k is a number of bits of $x'^{B,k}$.

Further various embodiments relate to a method for a cryptographic operation using masked coefficients of a polynomial having d arithmetic shares for lattice-based cryptography in a processor, the instructions, including: performing a boundary check on each of the coefficients of the polynomial, wherein the performing the boundary check includes: shifting an arithmetic share of the d arithmetic shares by a first bound $\lambda_0$; converting the d shifted arithmetic shares to d Boolean shares; securely subtracting the first bound $\lambda_0$ and a second bound $\lambda_1$ from the Boolean shares to obtain $z'^{B,k+1}$ having d shares, wherein k is a number of bits in the masked coefficients of the polynomial; setting the shares of a boundary check bit to a sign bit of $z'^{B,k+1}$; and combining the shares of the boundary check bits for all of the coefficients of the polynomial to produce a boundary check bit b; and carrying out a cryptographic operation using the d arithmetic shares of the polynomial when b indicates that the coefficients of the polynomial are within the first bound $\lambda_0$ and second bound $\lambda_1$.

Various embodiments are described, wherein shifting an arithmetic share of the d arithmetic shares by a first bound $\lambda_0$ includes calculating: $x'^{A_q}_0 \leftarrow x_0^{A_q} + \lambda_0 \bmod q$, where $x'^{A_q}_0$ is an arithmetic masked coefficient of a polynomial, $x'^{A_q}_0$ is the shifted arithmetic shares, and q is an integer modulus.

Various embodiments are described, wherein converting the d shifted arithmetic shares to d Boolean shares includes calculating $x'^{B,k} \leftarrow A2B_q(x'^{A_q})$, where $x'^{B,k}$ is the shifted Boolean shares, $x'^{A_q}$ are the d shifted arithmetic shares, $A2B_q$ is a function that converts arithmetic shares to Boolean shares, and q is an integer modulus.

Various embodiments are described, wherein securely subtracting the first bound $\lambda_0$ and a second bound $\lambda_1$ from the Boolean shares includes converting $\lambda_0+\lambda_1$ to a two's complement representation and securely adding the two's complement representation to the Boolean shares.

Various embodiments are described, wherein includes calculating $z'^{B,k+1} \leftarrow \mathrm{SecAdd}(x'^{B,k}, 2^{k+1}-(\lambda_0+\lambda_1+1))$ where $x'^{B,k}$ is the shifted Boolean shares and k is a number of bits of $x'^{B,k}$.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The signing operation of a digital signature scheme generates a signature for a given message using a secret key. If this secret key was to be leaked, it would invalidate the security properties provided by the scheme. It has been shown that unprotected implementations of post-quantum signature schemes are vulnerable to implementation attacks, e.g., side-channel analysis. In particular, it was demonstrated that the secret key can be extracted from physical measurements of key-dependent parts in the signing operation. For several post-quantum digital signature schemes, the key-dependent operations include the rejection check of polynomials. In the Dilithium protocol in particular, there are two rejection criteria that depend on the sensitive values z and ř. The check on z prevents a possible leak of secret information when z is made public as part of the signature. The second check on ř ensures the correctness of the scheme and, after unmasking this value, simplifies the calculation of the hint h (another part of the signature). Both checks assert that all the coefficients of z and ř lie in their respective required bounds. While this rejection check operation is trivial in the unmasked case, a secure implementation of these digital signature schemes requires the integration of dedicated countermeasures for this step.

Masking is a common countermeasure to thwart side-channel analysis and has been utilized for various applications. Besides security, efficiency is also an important aspect when designing a masked algorithm. Important metrics for software implementations of masking are the number of operations and the number of fresh random elements required for the masking scheme.

The first dedicated masking scheme for a lattice-based signature schemes was presented in Gilles Barthe, Sonia Belaïd, Thomas Espitau, Pierre-Alain Fouque, Benjamin Grégoire, Mélissa Rossi, and Mehdi Tibouchi, *Masking the GLP lattice-based signature scheme at any order*, Advances in Cryptology—EUROCRYPT 2018—37th Annual International Conference on the Theory and Applications of Cryptographic Techniques, Tel Aviv, Israel, Apr. 29-May 3, 2018 Proceedings, Part II (Jesper Buus Nielsen and Vincent Rijmen, eds.), Lecture Notes in Computer Science, vol. 10821, Springer, 2018, pp. 354-384 (Barthe). To reject arithmetically masked polynomials, the authors propose to use Boolean-masked bound checks for each coefficient. To this end, they first convert the arithmetic shares to Boolean shares, before using Boolean-masked addition to check multiple bounds. The intermediate result of the rejection check is kept in shares as well, and only unmasked as the final decision when all coefficients of the input polynomial have been processed. Overall, this approach requires a costly conversion in addition to multiple costly Boolean-masked additions. The same basic approach was also used for masking qTesla in Francois Gérard and Mélissa Rossi, *An efficient and provable masked implementation of qtesla*, Smart Card Research and Advanced Applications—18th International Conference, CARDIS 2019, Prague, Czech Republic, Nov. 11-13, 2019, Revised (Sonia Belaïd and Tim Güneysu, eds.), Lecture Notes in Computer Science, vol. 11833, Springer, 2019, pp. 74-91 (Gérard). Further, this approach was slightly optimized for masking Dilithium in Vincent Migliore, Benoît Gérard, Mehdi Tibouchi, and Pierre-Alain Fouque, *Masking dilithium—efficient implementation and side-channel evaluation*, Applied Cryptography and Network Security—17th International Conference, ACNS 2019, Bogota, Colombia, Jun. 5-7, 2019, Proceedings (Robert H. Deng, Valerie Gauthier-Umaña, hoa, and Moti Yung, eds.), Lecture Notes in Computer Science, vol. 11464, Springer, 2019, pp. 344-362 (Migliore). Still, all of these solutions require multiple costly Boolean-masked additions.

Copending U.S. patent application Ser. No. 17/835,989, filed Jun. 8, 2022, Entitled "PROTECTING POLYNOMIAL REJECTION THROUGH MASKED COMPRESSED COMPARISON" (the '898 application) (which is hereby incorporated for all purposes as if included herein) proposed an efficient approach to perform masked rejection of polynomials, based on a new compression algorithm. It has been shown that it significantly outperforms the existing approaches in both runtime and randomness requirements. However, it requires a dedicated search for compression parameters for each use case, and for some bound check parameters, these might not exist.

In the context of post-quantum digital signatures, norm checks must be performed on polynomials as illustrated by candidates to the NIST standardization effort. Norm checks allow the verification that all the coefficients of a given polynomial are smaller than a given threshold. Specifically, it checks that the property $-\lambda_0 \leq x_i \leq \lambda_1$ mod q is met for all the coefficients $x_i$, given some bounds $\lambda_0$ and $\lambda_1$ as well as a modulus q.

Simultaneously, side-channel attacks against such constructions exist calling for dedicated countermeasures such as masking. Hence, protecting these masked norm checks in an efficient manner is critical. This disclosure introduces performing norm checks on polynomials protected against side-channel attacks with arithmetic masking.

A first class of existing academic solutions follow the basic and generic approach of computing a bound check with Boolean-masked additions. Another approach found in the '898 application includes finding an easy-to-mask compression function, for which only the values which do not lead to rejection will be compressed to a zero. While the second solution provides performance benefits over the first one, it is still limited in several ways. First, for each of the parameters used for the rejection determination, a new compression function must be found. Second, finding a suitable compression function requires an expensive greedy parameter search. This is a major drawback when large moduli are involved.

An alternative way to perform a masked norm-based rejection check is described herein, which is generic in both the norm bounds ($\lambda_0$ and $\lambda_1$) and with the modulus (q) of the polynomial coefficients. Despite the fact that this new solution is generic, it also comes with performance improvement over previous state-of-the-art for practically-relevant parameters.

The key feature of the rejection check disclosed herein is to leverage arithmetic masking with an arbitrary modulus to perform arithmetic operations on the coefficients, which can be performed almost for free in that context. Then, the rejection check disclosed herein takes advantage of signed addition with a known constant and a power-of-two modulus. The latest implementations disclosed are relatively efficient in software thanks to recent improvements in the state-of-the-art. See Olivier Bronchain and Gaetan Cassiers, *Bitslicing arithmetic/boolean masking conversions for fun and profit with application to lattice-based kems*, IACR Cryptol. ePrint Arch. (2022), 158 (Bronchain).

Masking allows the protection of an intermediate variable x against side-channel attack by enforcing an implementation to replace manipulations on x by manipulations on d shares that represent x. Each masked share is uniformly distributed such that any combination of d−1 is independent of x. The rejection check disclosed herein makes use of two ways to split the variable to be protected—namely arithmetic masking and Boolean masking.

With arithmetic masking, a variable $x \in \mathbb{Z}_q$ is protected for an arbitrary modulus q. The ensemble of d shares of x is denoted as the arithmetic sharing $x^{A_q} \in \mathbb{Z}_q^d$. The i-th share is denoted as $x_i^{A_q} \in \mathbb{Z}_q^d$ for all $0 \leq i < d$. The relationship between the shares and x are given such that the sum of all the shares over $\mathbb{Z}_q$ is x. Specifically, $$x = \sum_{i=0}^{d-1} x_i^{A_q} \bmod q.$$

Eventually, it is noted that computing in a protected manner z=x+y mod q with a public constant $y \in \mathbb{Z}_q$, a sharing $x^{A_q}$, and an output sharing $z^{A_q}$ can simply be computed. Indeed, the addition with y may be applied only to a single share in $x^{A_q}$ because $$z = \sum_{i=0}^{d-1} z_i^{A_q} = x_0^{A_p} + y + \sum_{i=0}^{d-1} x_i^{A_q}$$

$$= y + \sum_{i=0}^{d-1} x_i^{A_q} = y + x$$

Similar to arithmetic masking, Boolean masking enables the protection of a k-bit variable x. The ensemble of the d shares of x is denoted as the Boolean sharing $x^{B,k}$ and the i-th share is denoted as $x_i^{B,k}$. The sharing of the j-th bit of x is denoted as $x_i^{B,k}[j]$. The relation between x and its shares is given as:

$$x = \bigoplus_{i=0}^{d-1} x_i^{B,k},$$

where $\oplus$ denotes a bitwise exclusive OR (XOR).

Some useful algorithms for use in masking will now be described. Masking conversions are algorithms (e.g., $A2B_q$) that convert an arithmetic masking for x mod p into its k-bit Boolean masking. Specifically, it satisfies the property $x'^{(B,k)} = A2B_q(x^{A_p})$ with $p<2^k$ and the relation $$x = \sum_{j=0}^{j=k-1} 2^j \cdot x'[j].$$

Next, the addition of masked Boolean representations such as $z^{B,k+1} = \text{SecAdd}(x^{B,k}, y^{B,k})$ implement $z = x+y$. The bitwise Boolean AND between two Boolean sharing is expressed with $z^{B,k} = \text{SecAnd}(x^{B,k}, y^{B,k})$ such that $z = x \& y$.

Many solutions exist to implement these algorithms. In this work, the algorithms and their corresponding security proofs proposed in Bronchain are used.

The goal of the rejection check is to output a single (unmasked) bit b representing whether a polynomial should be rejected because any of its coefficients are not in the expected bounds. The core of the rejection check is to check whether a single coefficient is in bound, which is described in Algorithm 1 SecBoundCheck. Finally, how to use SecBoundCheck in order to perform rejection on a full polynomial is described in algorithm 2 SecReject.

The SecBoundCheck algorithm takes as inputs an arithmetic masking $x^{A_q}$ of a variable x, $q<2^k$, and bounds $\lambda_0$ and $\lambda_1$ with $\lambda_0 + \lambda_1 < q$. The SecBoundCheck algorithm outputs a masked bit $b^{B,1}$ protected with Boolean masking. The unmasked bit b is set to 1 only if x is in the bounds such that $-\lambda_0 \leq x \leq \lambda_1$ mod q and is set to 0 otherwise.

The first step as shown in line 1 is to shift the values of $x^{A_q}$ by adding $\lambda_0$ to the input sharing $x^{A_q}$. Note that $\lambda_0$ only needs to be added to one of the shares which in this example is $x_0^{A_q}$. This maps the rejection check problem to setting the output to 1 only if x is smaller or equal $\lambda_0 + \lambda_1$. Then, the shifted arithmetic sharing $x'^{A_q}$ is converted into a Boolean sharing $x'^{B,k}$ as shown in line 2. Next, $\lambda_0 + \lambda_1 + 1$ is securely subtracted from $x'^{B,k}$ by leveraging a two's complement representation on k+1 bits (i.e., $2^{k+1} - (\lambda_0 + \lambda_1 + 1)$) as shown in line 3. Thus, the two's complement representation is securely added to $x'^{B,k}$ using the SecAdd function to implement the secure subtraction. As a result, z' is negative only if $x' \leq \lambda_0 + \lambda_1$. Hence, the output bit $b^{B,1}$ is the sign-bit of z' (in this case the most significant bit or the k-th bit) as shown in line 4.

Algorithm 1 SecBoundCheck

Input: Arithmetic sharing $x^{A_q}$, integer $q < 2^k$ and bounds $\lambda_0$ and $\lambda_1$ with $\lambda_0 + \lambda_1 < q$.
Output: Boolean sharing $b^{B,1}$ with $b = 1$ if $-\lambda_0 \leq x \leq \lambda_1$ mod q, $b = 0$ otherwise.
1: $x_0'^{A_q} \leftarrow x_0^{A_q} + \lambda_0$ mod q  ▷ $b = 1$ iff $0 \leq x' \leq \lambda_1 + \lambda_0$ mod q
2: $x'^{B,k} \leftarrow A2B_q(x'^{A_q})$  ▷ SecA2B in Bronchain
3: $z'^{B,k+1} \leftarrow \text{SecAdd}(x'^{B,k}, 2^{k+1} - (\lambda_0 + \lambda_1 + 1))$
▷ $b = 1$ iff $z' < 0$. SecAdd in Bronchain
4: $b^{B,1} \leftarrow z'^{B,k+1}[k]$ Now the algorithm SecReject for the rejection of full polynomials based upon a bound check on each of its coefficients will be described. SecBoundCheck detailed above may be used to perform rejection on full masked polynomials as detailed in Algorithm 2 SecReject below. Specifically, the SecBoundCheck is first applied to all the coefficient independently. In lines 1 and 2 a loop over all n of the coefficients $x^{A_q}[i]$ of the polynomial being checked to produce masked bit $b^{B,n}[i]$ for each of the coefficients. Then, all the masked bits $b^{B,n}[i]$ are ANDed together such that if one of the j coefficients is not in the bounds, the output bit will be equal to zero. Lines 3 to 6 perform this AND function by splitting the bits in half and bitwise ANDing them together using the SecAND function. This is repeated until just the final masked bit that is the combination of the masked bits remains. The approach outlined in lines 3 to 6 takes advantage of the fact that n is a power of 2 and leads to an efficient implementation. If that is not the case, other approaches for combining the bits may be used. Finally, the output resulting bit b is unmasked and returned by combining together the masked shares $b_i^{B,1}$ of b as shown in line 8. Alternatively, if the index of the coefficient that is rejected is not sensible, an early abort strategy may be used. In this situation, the outputs of SecBoundCheck are directly unmasked.

Algorithm 2 SecReject

Input: Arithmetic sharings for n coefficients $x^{A_q}[j]$ with $0 \leq j < n$, integer $q < 2^k$ and bounds
$\lambda_0$ and $\lambda_1$ with $\lambda_0 + \lambda_1 < q$.
Output: Bit b with $b = 1$ if $-\lambda_0 \leq x[j] \leq \lambda_1$ mod q for all $0 \leq j < n$, $b = 0$ otherwise.
1: for i in 0 ... n − 1 do
2: $\quad b^{B,n}[i] \leftarrow \text{SecBoundCheck}(x^{A_q}[i])$  ▷ Check all coefficients individually
3: while n > 1 do  ▷ Summarize all coefficients
4: $\quad$ for i in 0 ... n/2 − 1 do
5: $\quad\quad b^{B,n}[i] \leftarrow \text{SecAnd}(b^{B,n}[i], b^{B,n}[i + n/2])$
6: $\quad n \leftarrow n/2$
7: $b^{B,1} \leftarrow b^{B,n}[0]$
8: $b \leftarrow \bigoplus_{i=0}^{d-1} b_i^{B,1}$  ▷ Unmask the output bit The rejection check disclosed herein solves the same problem as the '898 application. However, the rejection check disclosed herein leads to the two following improvements discussed below.

The '898 application requires a search for a suitable compression function for each of the parameters of SecBoundCheck that are $\lambda_0$, $\lambda_1$ and q. This usually implies an expensive exhaustive search for which the existence of a suitable compression function is not clear. Instead, the solution detailed in SecBoundCheck is generic. SecBoundCheck may be applied to all the parameter sets $\lambda_0$, $\lambda_1$, and q by simply changing constants. The constants are analytically derived from the parameters of the bound check.

Figure 1A:
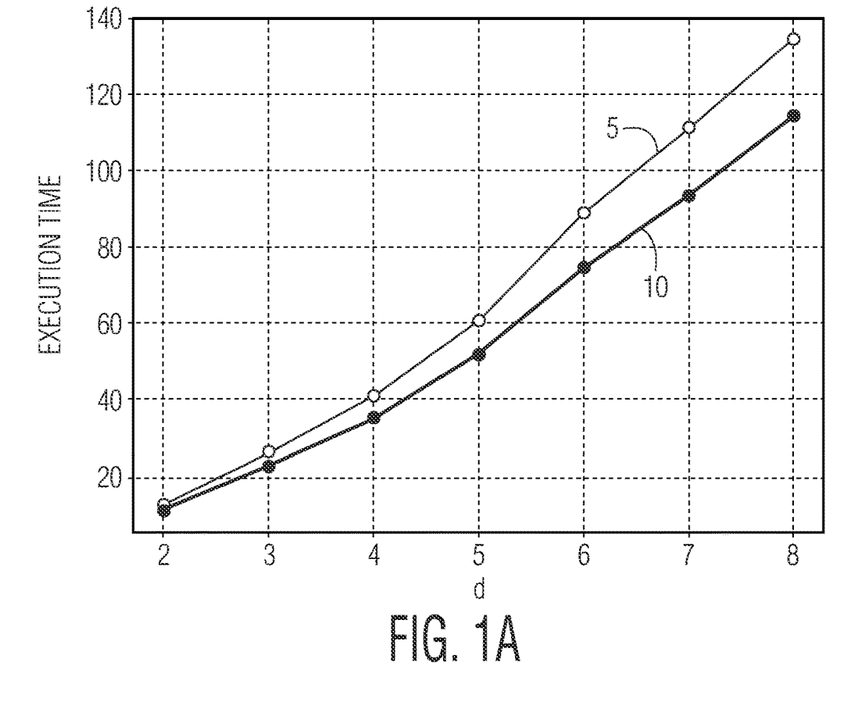
FIGS. 1A and 1B illustrate the performance of SecBoundCheck versus the '898 application.
Figure 1B:
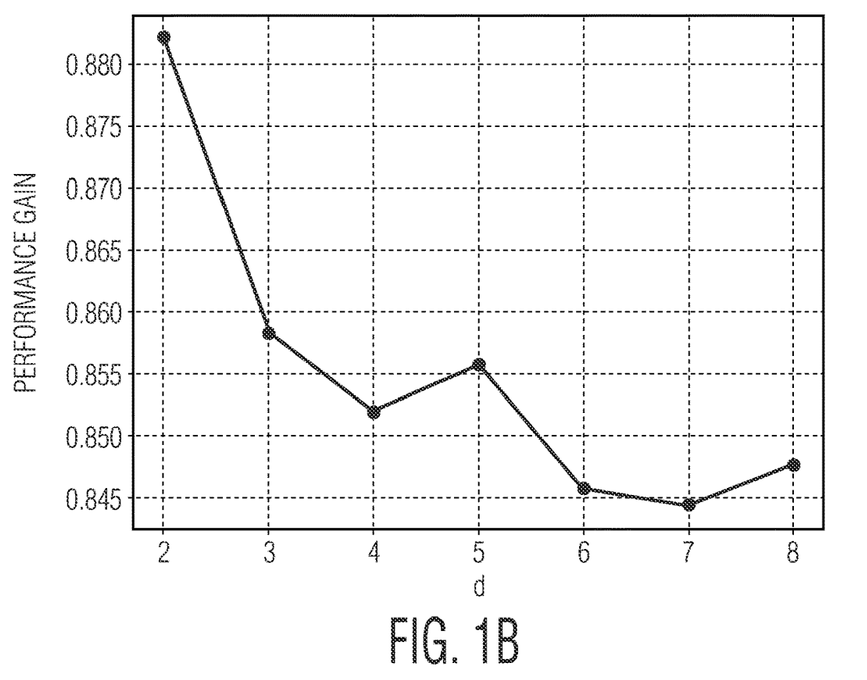

SecBoundCheck is more efficient than the '898 application, especially given the recent improvements in the underlying SecAdd and $A2B_q$ proposed in Bronchain. The performance gain is illustrated in FIGS. 1A and 1B that illustrate the performance of SecBoundCheck versus the '898 application. FIG. 1A illustrates a plot of execution time versus the number of shares d. Plot 5 is for the '898 application, and plot 10 is for SecBoundCheck. FIG. 1B illustrates a plot of the ratio of the SecBoundCheck performance and the '898 performance versus the number of shares d. It may be observed that the SecBoundCheck improves upon the '898 application approach by a factor between 12% and 15% depending on the number of shares d.

The countermeasures that result from using the implementation of the rejection of masked polynomial coefficients provide a technological advantage over the prior art by using a SecReject function that requires fewer calculations than prior implementations. This will allow for lattice based post-quantum cryptography schemes to be implemented in more applications that have limited processing resources.

Figure 2:
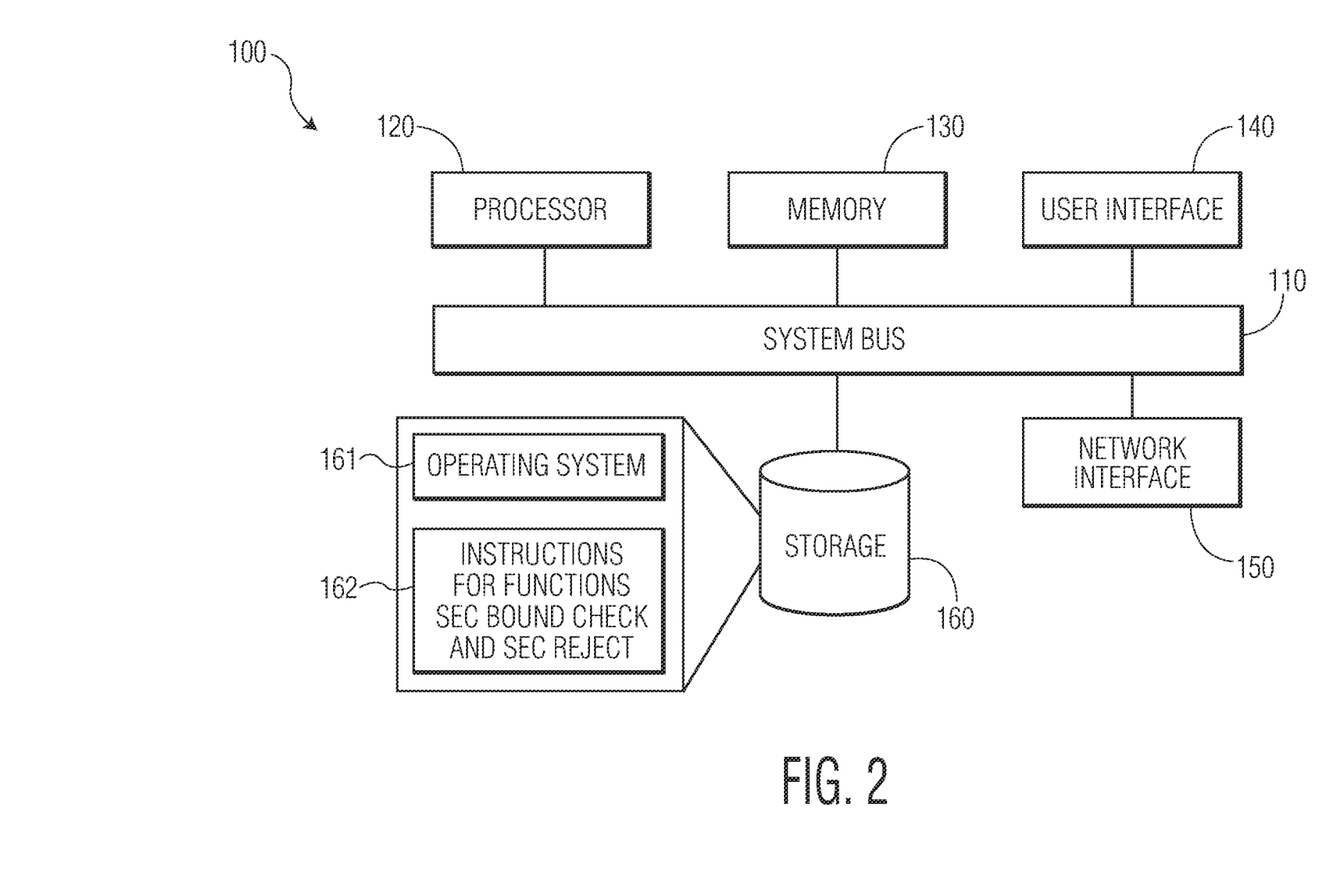
FIG. 2 illustrates an exemplary hardware diagram for implementing polynomial rejection by using SecBoundCheck and SecReject.

FIG. 2 illustrates an exemplary hardware diagram 100 for implementing polynomial rejection by using SecBoundCheck and SecReject. As illustrated, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, microcontroller, graphics processing unit (GPU), field programmable gate array (FPGA), application-specific integrated circuit (ASIC), or other similar devices. The processor may be implemented as a secure processor or may include both a secure processor and unsecure processor.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user as needed. For example, the user interface 140 may include a display, a touch interface, a mouse, and/or a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol or other communications protocols, including wireless protocols. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. The storage 162 may include instructions for implementing polynomial rejection by using functions SecBoundCheck and SecReject described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A data processing system comprising instructions embodied in a non-transitory computer readable medium, the instructions for efficiently protecting a cryptographic operation against side channel effects by using masked coefficients of a polynomial having d arithmetic shares for lattice-based cryptography in a processor, the instructions, comprising:
   shifting each arithmetic share of the d arithmetic shares by a first bound $\lambda_0$;
   converting the d shifted arithmetic shares to d Boolean shares;
   securely subtracting the first bound $\lambda_0$ and a second bound $\lambda_1$ from the d Boolean shares to obtain $z'^{B,k+1}$ having d shares, wherein k is a number of bits in the masked coefficients of the polynomial, where $z'^{B,k+1}$ are shifted Boolean shares;
   setting d shares of a boundary check bit to a sign bit of $z'^{B,\overline{k}+1}$; and
   carrying out the cryptographic operation using the d arithmetic shares of the polynomial, wherein the cryptographic operation is efficiently protected against side channel attacks when the d shares of the boundary check bit indicate that the masked coefficients of the polynomial are within the first bound $\lambda_0$ and the second bound $\lambda_1$.

2. The data processing system of claim 1, further comprising unmasking the boundary check bit by combining the d shares of the boundary check bit.

3. The data processing system of claim 1, wherein shifting an arithmetic share of the d arithmetic shares by a first bound $\lambda_0$ includes calculating:

$$x'^{A_q}_0 \leftarrow x^{A_q}_0 + \lambda_0 \bmod q,$$

where $x^{A_q}_0$ is an arithmetic masked coefficient of a polynomial and q is an integer modulus.

4. The data processing system of claim 1, wherein converting the d shifted arithmetic shares to d Boolean shares includes calculating:

$$x'^{B,k} \leftarrow A2B_q(x'^{A_q}),$$

where $x'^{B,k}$ are the d Boolean shares, $x'^{A_q}$ are the d shifted arithmetic shares, $A2B_q$ is a function that converts arithmetic shares to Boolean shares, and q is an integer modulus.

5. The data processing system of claim 1, wherein securely subtracting the first bound $\lambda_0$ and a second bound $\lambda_1$ from the d Boolean shares includes converting $\lambda_0 + \lambda_1$ to a two's complement representation and securely adding the two's complement representation to the d Boolean shares.

6. The data processing system of claim 5, wherein converting $\lambda_0 + \lambda_1$ to a two's complement representation and securely adding the two's complement representation to the d Boolean shares includes calculating:

$$z'^{B,k+1} \leftarrow \text{SecAdd}(x'^{B,k}, 2^{k+1} - (\lambda_0 + \lambda_1 + 1))$$

where $x'^{B,k}$ are the d Boolean shares and k is a number of bits of $x'^{B,k}$.

7. A data processing system comprising instructions embodied in a non-transitory computer readable medium, the instructions for efficiently protecting a cryptographic operation against side channel effects by using masked coefficients of a polynomial having d arithmetic shares for lattice-based cryptography in a processor, the instructions, comprising:
   performing a boundary check on each of the masked coefficients of the polynomial, wherein the performing the boundary check includes:
      shifting each arithmetic share of the d arithmetic shares by a first bound $\lambda_0$;
      converting the d shifted arithmetic shares to d Boolean shares;
      securely subtracting the first bound $\lambda_0$ and a second bound $\lambda_1$ from the Boolean shares to obtain $z'^{B,k+1}$ having d shares, wherein k is a number of bits in the masked coefficients of the polynomial, where $z'^{B,k+1}$ are Boolean shares;
      setting d shares of a boundary check bit to a sign bit of $z'^{B,\overline{k}+1}$; and
   combining the shares of the boundary check bits for all of the coefficients of the polynomial to produce a boundary check bit b; and
   carrying out the cryptographic operation using the d arithmetic shares of the polynomial, wherein the cryptographic operation is efficiently protected against side channel attacks when b indicates that the coefficients of the polynomial are within the first bound $\lambda_0$ and the second bound $\lambda_1$.

8. The data processing system of claim 7, wherein shifting an arithmetic share of the d arithmetic shares by a first bound $\lambda_0$ includes calculating:

$$x'^{A_q}_0 \leftarrow x^{A_q}_0 + \lambda_0 \bmod q,$$

where $x^{A_q}_0$ is an arithmetic masked coefficient of a polynomial, $x'^{A_q}_0$ are the d shifted arithmetic shares, and q is an integer modulus.

9. The data processing system of claim 7, wherein converting the d shifted arithmetic shares to d Boolean shares includes calculating:

$$x^{B,K} \leftarrow A2B_q(x'^{A_q}),$$

where $x'^{B,k}$ are the d Boolean shares, $x'^{A_q}$ are the d shifted arithmetic shares, $A2B_q$ is a function that converts arithmetic shares to Boolean shares, and q is an integer modulus.

10. The data processing system of claim 7, wherein securely subtracting the first bound $\lambda_0$ and a second bound $\lambda_1$ from the Boolean shares includes converting $\lambda_0+\lambda_1$ to a two's complement representation and securely adding the two's complement representation to the Boolean shares.

11. The data processing system of claim 10, wherein includes calculating:

$$z'^{B,k+1} \leftarrow \text{SecAdd}(x'^{B,k}, 2^{k+1}-(\lambda_0+\lambda_1+1))$$

where $x'^{B,k}$ are the d Boolean shares and k is a number of bits of $x'^{B,k}$.

12. A method efficiently protecting for a cryptographic operation against side channel effects by using masked coefficients of a polynomial having d arithmetic shares for lattice-based cryptography in a processor, the instructions, comprising:
  shifting each arithmetic share of the d arithmetic shares by a first bound $\lambda_0$;
  converting the d shifted arithmetic shares to d Boolean shares;
  securely subtracting the first bound $\lambda_0$ and a second bound $\lambda_1$ from the Boolean shares to $z'^{B,k+1}$ having d shares, wherein k is a number of bits in the masked coefficients of the polynomial, where $z'^{B,k+1}$ are Boolean shares;
  setting d shares of a boundary check bit to a sign bit of $z'^{B,k+1}$; and
  carrying out the cryptographic operation using the d arithmetic shares of the polynomial, wherein the cryptographic operation is efficiently protected against side channel attacks when the d shares of the boundary check bit indicate that the coefficients of the polynomial are within the first bound $\lambda_0$ and the second bound $\lambda_1$.

13. The method of claim 12, further comprising unmasking the boundary check bit by combining the d shares of the boundary check bit.

14. The method of claim 12, wherein shifting an arithmetic share of the d arithmetic shares by a first bound $\lambda_0$ includes calculating:

$$x'^{A_q}_0 \leftarrow x^{A_q}_0 + \lambda_0 \bmod q,$$

where $x^{A_q}_0$ is an arithmetic masked coefficient of a polynomial and q is an integer modulus.

15. The method of claim 12, wherein converting the d shifted arithmetic shares to d Boolean shares includes calculating:

$$x'^{B,k} \leftarrow A2B_q(x'^{A_q}),$$

where $x'^{B,k}$ are the d Boolean shares, $x'^{A_q}$ are the d shifted arithmetic shares, $A2B_q$ is a function that converts arithmetic shares to Boolean shares, and q is an integer modulus.

16. The method of claim 12, wherein securely subtracting the first bound $\lambda_0$ and a second bound $\lambda_1$ from the Boolean shares includes converting $\lambda_0+\lambda_1$ to a two's complement representation and securely adding the two's complement representation to the Boolean shares.

17. The method of claim 16, wherein converting $\lambda_0+\lambda_1$ to a two's complement representation and securely adding the two's complement representation to the Boolean shares includes calculating:

$$z'^{B,k+1} \leftarrow \text{SecAdd}(x'^{B,k}, 2^{k+1}-(\lambda_0+\lambda_1+1))$$

where $x'^{B,k}$ are the d Boolean shares and k is a number of bits of $x'^{B,k}$.

18. A method for efficiently protecting a cryptographic operation against side channel effects by using masked coefficients of a polynomial having d arithmetic shares for lattice-based cryptography in a processor, the instructions, comprising:
  performing a boundary check on each of the masked coefficients of the polynomial, wherein the performing the boundary check includes:
    shifting each arithmetic share of the d arithmetic shares by a first bound $\lambda_0$;
    converting the d shifted arithmetic shares to d Boolean shares;
    securely subtracting the first bound $\lambda_0$ and a second bound $\lambda_1$ from the Boolean shares to obtain $z'^{B,k+1}$ having d shares, wherein k is a number of bits in the masked coefficients of the polynomial, where $z'^{B,k+1}$ are Boolean shares;
    setting d shares of a boundary check bit to a sign bit of $z'^{B,k+1}$; and
    combining the shares of the boundary check bits for all of the coefficients of the polynomial, wherein the cryptographic operation is efficiently protected against side channel attacks to produce a boundary check bit b; and
  carrying out the cryptographic operation using the d arithmetic shares of the polynomial when b indicates that the coefficients of the polynomial are within the first bound $\lambda_0$ and second bound $\lambda_1$.

19. The method of claim 18, wherein shifting an arithmetic share of the d arithmetic shares by a first bound $\lambda_0$ includes calculating:

$$x'^{A_q}_0 \leftarrow x^{A_q}_0 + \lambda_0 \bmod q,$$

where $x^{A_q}_0$ is an arithmetic masked coefficient of a polynomial, $x'^{A_q}_0$ are the d shifted arithmetic shares, and q is an integer modulus.

20. The method of claim 18, wherein converting the d shifted arithmetic shares to d Boolean shares includes calculating:

$$x'^{B,k} \leftarrow A2B_q(x'^{A_q}),$$

where $x'^{B,k}$ are the d Boolean shares, $x'^{A_q}$ are the d shifted arithmetic shares, $A2B_q$ is a function that converts arithmetic shares to Boolean shares, and q is an integer modulus.

21. The method of claim 18, wherein securely subtracting the first bound $\lambda_0$ and a second bound $\lambda_1$ from the Boolean shares includes converting $\lambda_0+\lambda_1$ to a two's complement representation and securely adding the two's complement representation to the Boolean shares.

22. The method of claim 21, wherein the method further includes calculating:

$$z'^{B,k+1} \leftarrow \text{SecAdd}(x'^{B,k}, 2^{k+1}-(\lambda_0+\lambda_1+1))$$

where $x'^{B,k}$ are the d Boolean shares and k is a number of bits of $x'^{B,k}$.

* * * * *